April 14, 1964   D. M. MITCHELL ETAL   3,128,658
DEVICE FOR SHAVING CABLE CORE
Filed Jan. 8, 1962   13 Sheets-Sheet 1

INVENTORS D. M. MITCHELL
E. R. PHINNEY
BY
ATTORNEY

INVENTORS D. M. MITCHELL
E. R. PHINNEY

ATTORNEY

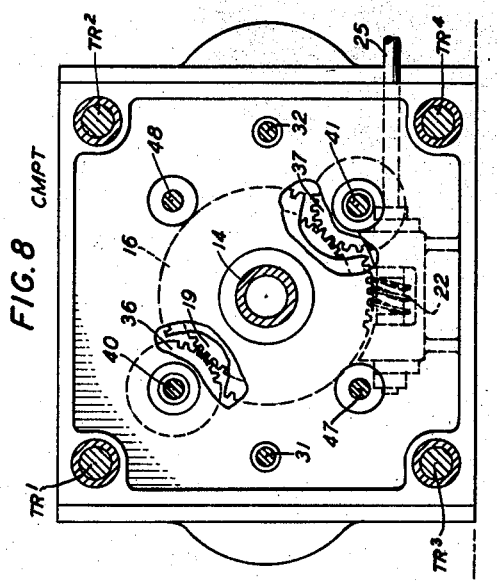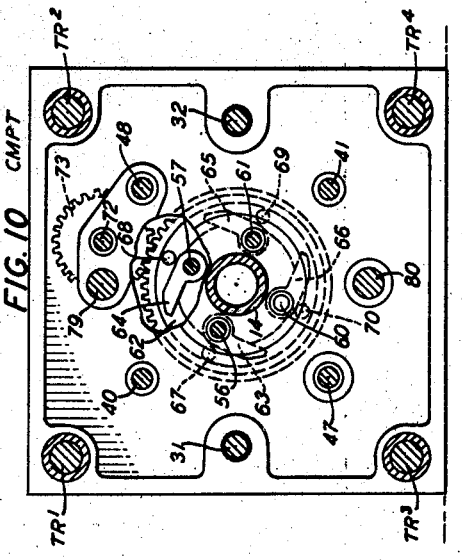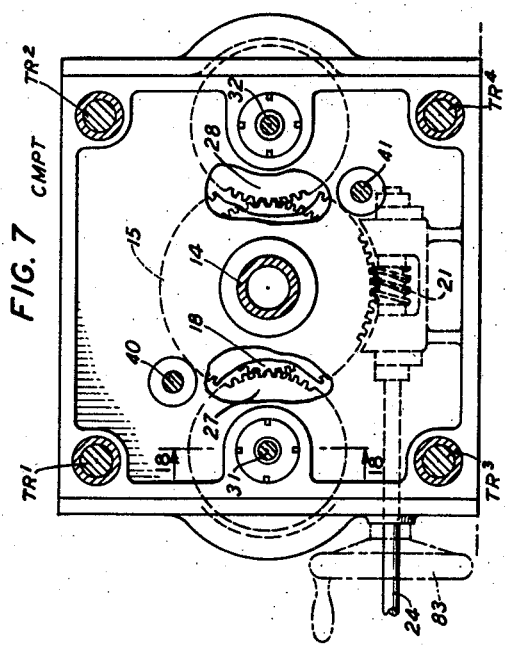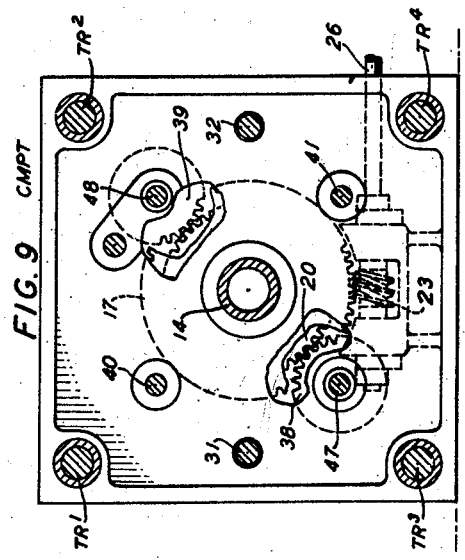

April 14, 1964  D. M. MITCHELL ETAL  3,128,658
DEVICE FOR SHAVING CABLE CORE
Filed Jan. 8, 1962  13 Sheets-Sheet 8

INVENTORS D. M. MITCHELL
E. R. PHINNEY
BY
ATTORNEY

April 14, 1964  D. M. MITCHELL ETAL  3,128,658
DEVICE FOR SHAVING CABLE CORE
Filed Jan. 8, 1962  13 Sheets-Sheet 9
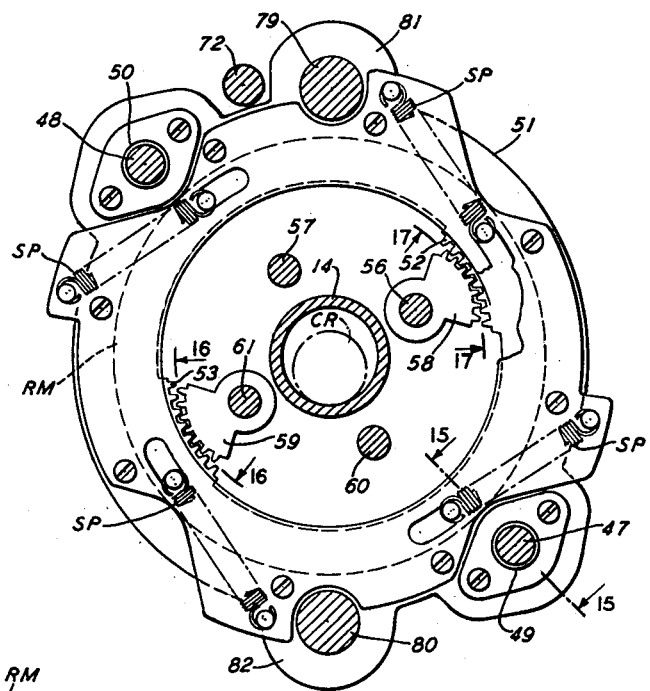
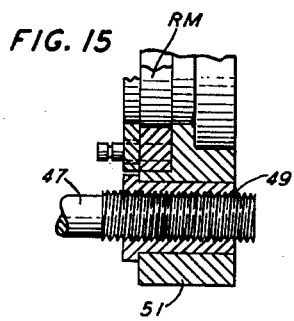
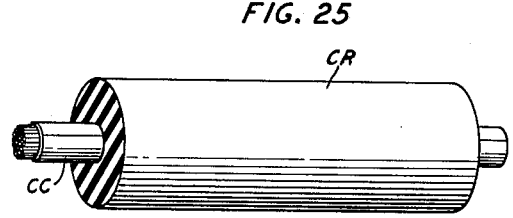
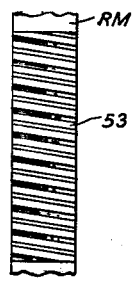
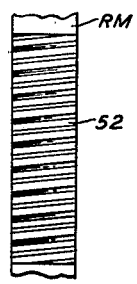
INVENTORS *D. M. MITCHELL*
*E. R. PHINNEY*
BY
ATTORNEY

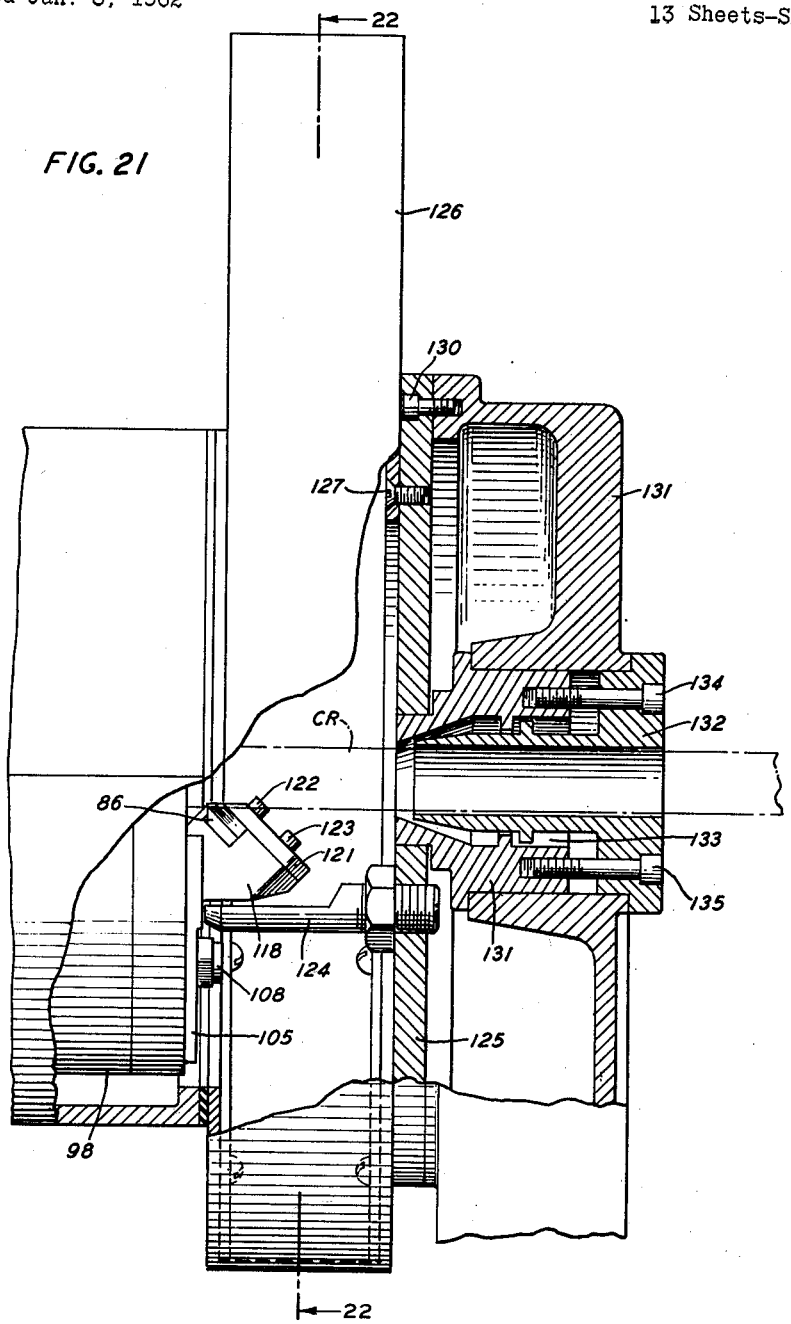

April 14, 1964

D. M. MITCHELL ETAL 3,128,658

DEVICE FOR SHAVING CABLE CORE

Filed Jan. 8, 1962

INVENTORS D. M. MITCHELL
E. R. PHINNEY
BY

ATTORNEY

INVENTORS D. M. MITCHELL
E. R. PHINNEY

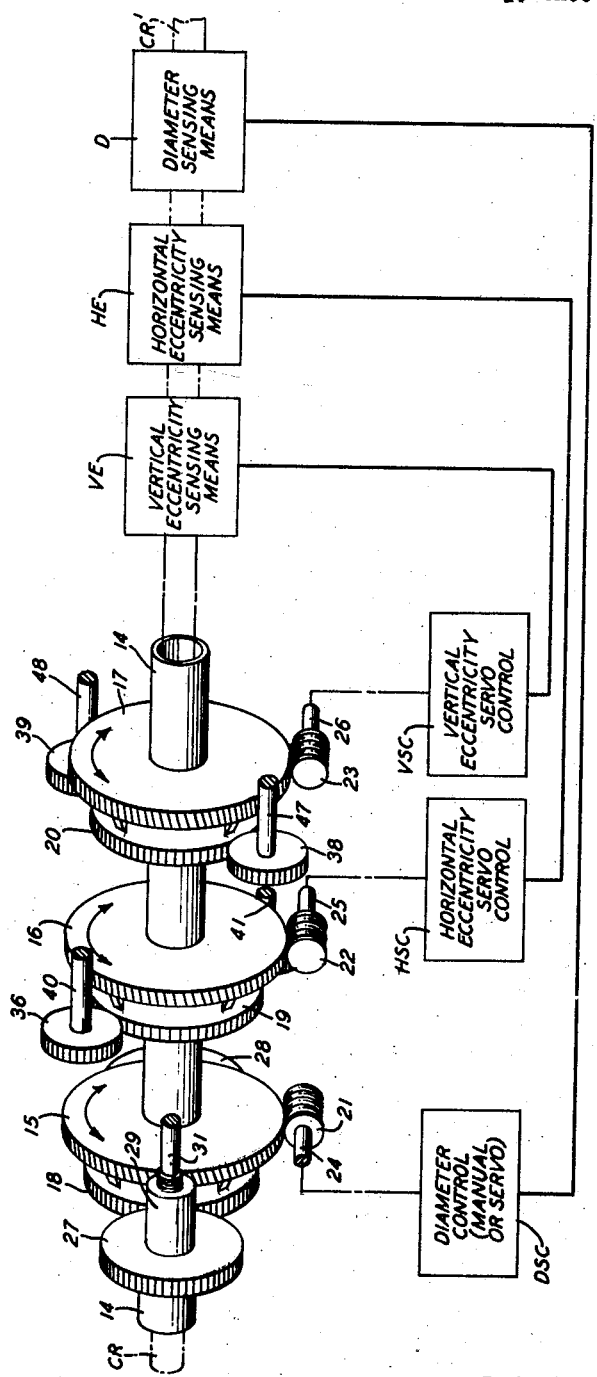

United States Patent Office

3,128,658
Patented Apr. 14, 1964

3,128,658
DEVICE FOR SHAVING CABLE CORE
David M. Mitchell, Middletown, N.J., and Earl R. Phinney, South Attleboro, Mass., assignors, by direct and mesne assignments, to Bell Telephone Laboratories, Incorporated, New York, N.Y., a corporation of New York
Filed Jan. 8, 1962, Ser. No. 164,901
3 Claims. (Cl. 82—20)

This invention relates to the manufacture of electrical conductors and more particularly to a method and means for shaving or sizing the extruded dielectric of coaxial cables and the like to control the external diameter of the cable core and at the same time assure the centering of the electrical conductor located within the dielectric.

It has been found that in the manufacture of insulated wires and cables, wherein the dielectric or covering of insulating material, for example, polyethylene, is extruded over the conductor or conductors to provide a central cable core, that it is not practical or possible to control the extrusion of the insulating material to the precise limits and close tolerances required for electrical transmission lines of great length, for example, underwater communication cables using high frequencies. Accordingly, the insulation as applied is slightly oversize and is subsequently shaved to essentially exact diameter.

In the manufacture of underwater communication cables, which of necessity are of great length, the attenuation must be known and controlled in order that suitable repeaters can be designed to compensate for the loss throughout the length of the cable. It is, therefore, imperative that the capacitance of the cable must remain constant or as nearly so as possible.

One object of our invention is to provide a mechanism for shaving the outer surface of the oversize cable insulation, for example, polyethylene. The insulation wall is passed through rapidly rotating knives suitably controlled to remove the excess amount of insulation to provide a cable core of substantially uniform diameter.

In accordance with our invention we have found that it is entirely feasible and possible to shave or size the dielectric covering of cable cores or conductors to the close tolerances required, by subjecting the extruded core, after cooling, to a device which automatically shaves the external surface of the core to the precise diameter required.

A more complete understanding of our invention will be readily apparent from the following detailed description when read with reference to the following drawings of which:

FIG. 7 is a fragmentary view, partly in section, of the diameter control input taken on line 7—7 of FIG. 1;

FIG. 8 is a fragmentary view, partly in section, of the horizontal control input taken on line 8—8 of FIG. 1;

FIG. 9 is a fragmentary view, partly in section, of the vertical control input taken on line 9—9 of FIG. 1;

FIG. 10 is a fragmentary view, partly in section, of the centering guide release, taken on line 10—10 of FIG. 1;

FIG. 14 is a fragmentary view, partly in section, of the centering control actuator assembly taken on line 14—14 of FIG. 13;

FIG. 15 is a view, partly in section, of the centering control drive bushing taken on line 15—15 of FIG. 14;

FIG. 16 is a fragmentary detail of one of the segmental centering gears taken on line 16—16 of FIG. 14;

FIG. 17 is also a fragmentary detailed view of one of the segmental centering gears taken on line 17—17 of FIG. 14;

FIG. 20 is a fragmentary sectional view showing in detail the structure of a roller and cam;

FIG. 21 is a side elevation view, with parts broken away, showing the cutting head, scrap disposal casing and air wiper;

FIG. 24 is a schematic diagram disclosing the electromechanical servo mechanism for controlling the diameter and eccentricity mechanisms; and FIG. 25 is a fragmentary view, in perspective, showing in detail the cable core disclosed in the various figures.

Figure 1:
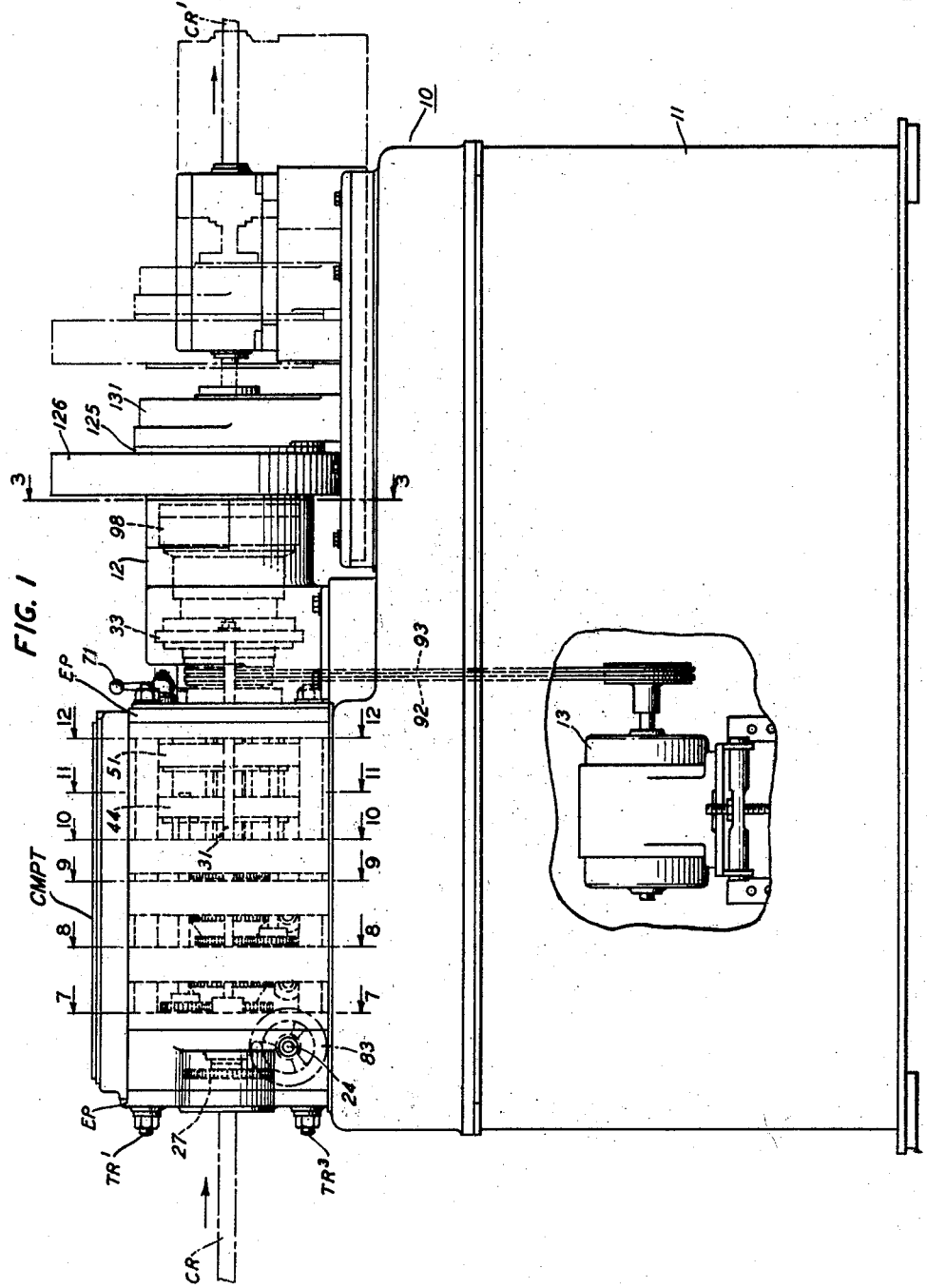
FIG. 1 is a side elevation view with parts broken away and the cable core and certain portions of the mechanism shown in dot and dash.

As shown in the drawings and with particular reference to FIG. 1 the numeral 10 designates the shaving mechanism of this invention which includes a base member 11 having mounted thereon the various components which cooperate to perform the desired function, i.e., to produce a core of uniform diameter and to minimize inner conductor eccentricity.

The device which is disclosed in the drawings both as to details and assemblies comprises a rotatable shaving head 12 driven by suitable means as shown at 13, the operation and control of which will be described in detail later on in the specification.

The core CR to be worked upon, as shown in the various figures, is fed from a suitable storage reel, not shown, under controlled speed and tension. It is rewound on a suitable reel, not shown, after it has passed through the machine, having been shaved to size and corrected as required for eccentricity under the control of the components which comprise the shaving mechanism.

Figure 2:
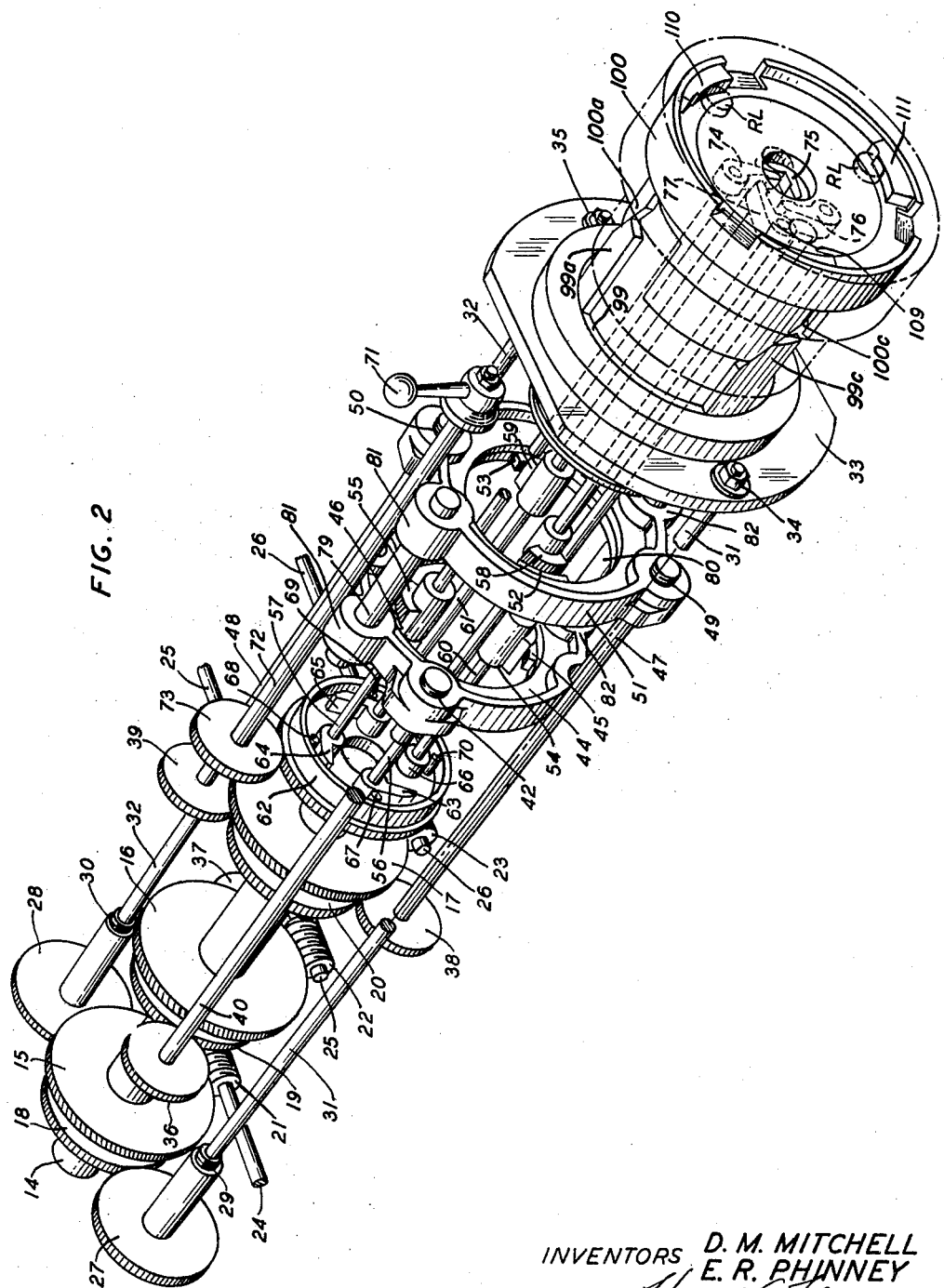
FIG. 2 is a fragmentary perspective view showing the gear train of the control mechanism and associated parts.
Figure 3:
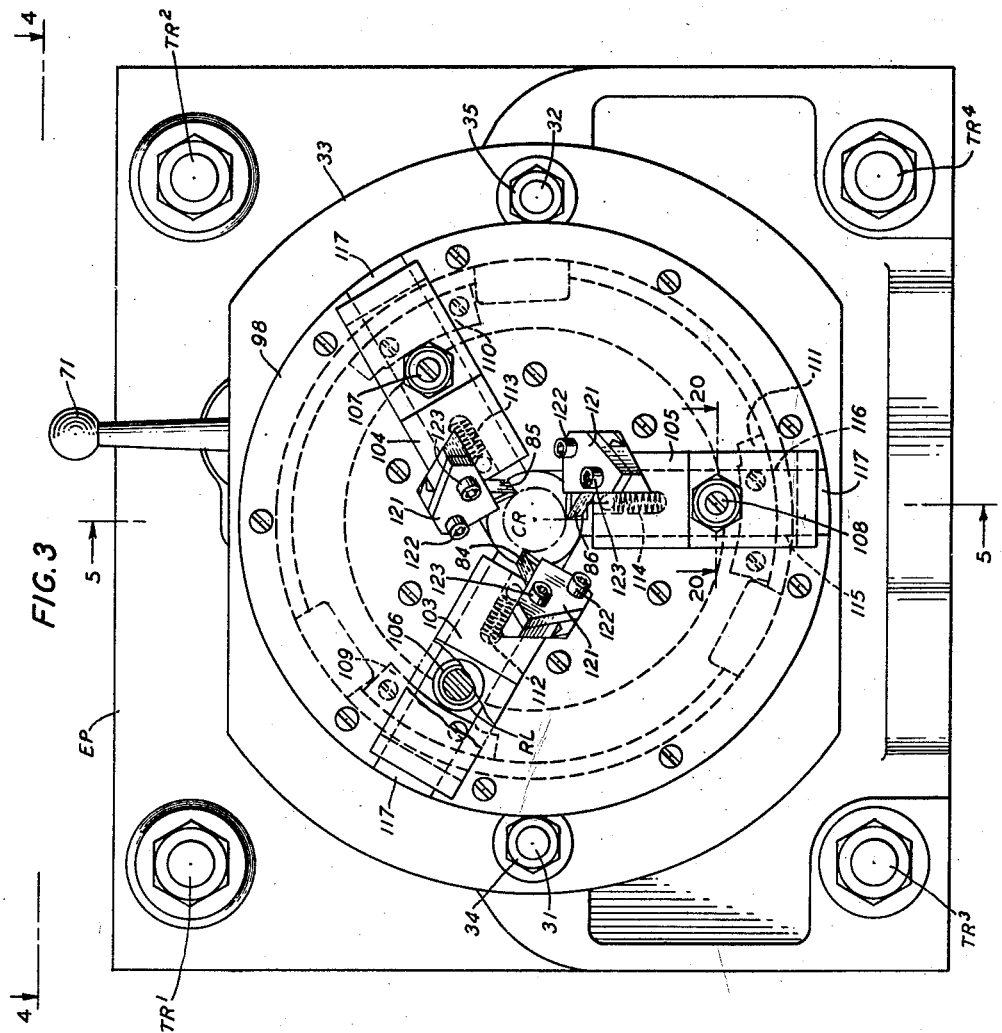
FIG. 3 is an elevation view of the blade assembly, with cable coming toward the observer, taken on line 3—3 of FIG. 1.

The unshaved core CR enters the shaver 10 through a suitable guide tube 14 which extends through the control gear compartment CMPT, which is assembled by means of the tie rods $TR^1$, $TR^2$, $TR^3$ and $TR^4$. The outer surface of the tube 14 serves as an axle upon which the gears 15, 16 and 17 are secured, together with their associated gears 18, 19 and 20, as shown in FIGS. 2 and 24. Suitable worm gears 21, 22 and 23 mounted on shafts 24, 25 and 26 are journaled in suitable bearings in the compartment casting CMPT and are in constant mesh with their respective gears 15, 16 and 17.

Figure 18:
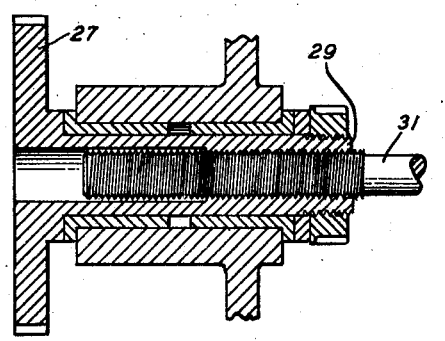
FIG. 18 is a fragmentary sectional view of the diameter control bushing, taken on line 18—18 of FIG. 7.

As shown in FIG. 2, pinions 27 and 28 in mesh with the gear 18 have internally threaded bushings at 29 and 30, as shown in FIG. 18, and are in threaded engagement with the longitudinally extending rods 31 and 32, the free ends of which are secured to the diameter control plate or ring 33 by means of the nuts 34 and 35. Thus, as the gear 18 rotates either clockwise or counterclockwise it causes the pinions 27 and 28 to rotate in a complementary manner which causes the shafts 31 and 32 to ride in or out of the threaded portion of the pinions 27 and 28 which in turn causes forward or backward movement of the diameter control plate 33.

Figure 11:
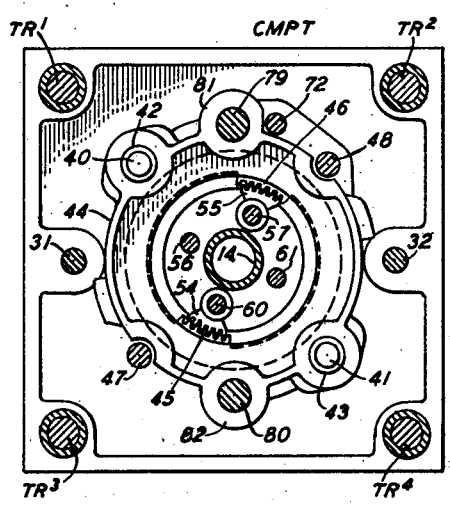
FIG. 11 is a fragmentary view, partly in section, of the horizontal control actuator taken on line 11—11 of FIG. 1.

With particular reference to FIGS. 2 and 24, there are shown two sets of pinions 36, 37 and 38, 39 which are in mesh with the gears 19 and 20, respectively. The pinions 36 and 37 are secured to the shafts 40 and 41, the free ends of which are in threaded engagement with mating apertures 42 and 43 in the ring casting 44 which includes the horizontal control actuator shown in FIG. 11 consisting of internal helical gear segments 45 and 46 which are in mesh with the gear sectors 54 and 55 on the shafts 57 and 60. The ring 44 with the helical gear segments 45 and 46 moves forward or backward in response to the direction of rotation of the shafts 40 and 41, which are driven by the pinions 36 and 37. Translation of gear segments 45 and 46 causes the mating gear sectors 54 and 55 to be rotated in opposite directions for the purpose hereinafter described.

Figure 12:
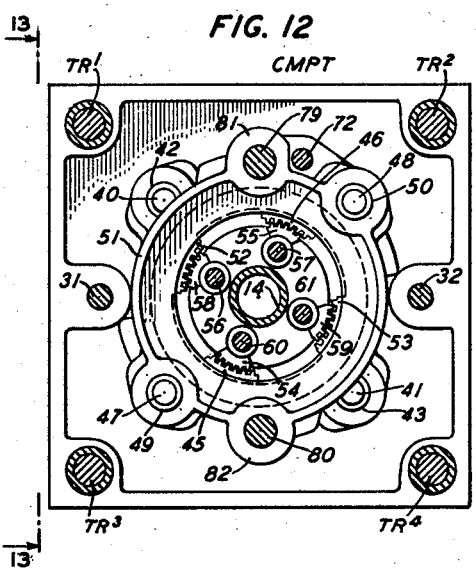
FIG. 12 is a fragmentary view, partly in section, of the vertical control actuator taken on line 12—12 of FIG. 1 (horizontal control actuator gears also appear in this view)

The pinions 38 and 39 are secured to the shafts 47 and 48 which in turn are in threaded engagement with mating threaded apertures 49 and 50 in the ring casting 51 which includes the vertical control actuator as shown in FIG. 12, consisting of internal helical gear segments 52 and 53, which are in mesh with the gear sectors 58 and 59 on shafts 56 and 61. The ring 51 with the helical gear segments 52 and 53 moves forward or backward in response to the direction of rotation imparted to the shafts 47 and 48 by the pinions 38 and 39 through the gear 20. Translation of gear segments 52 and 53 causes the mating gear sectors 58 and 59 to be rotated in opposite direction for the purpose hereinafter described.

Figure 5:
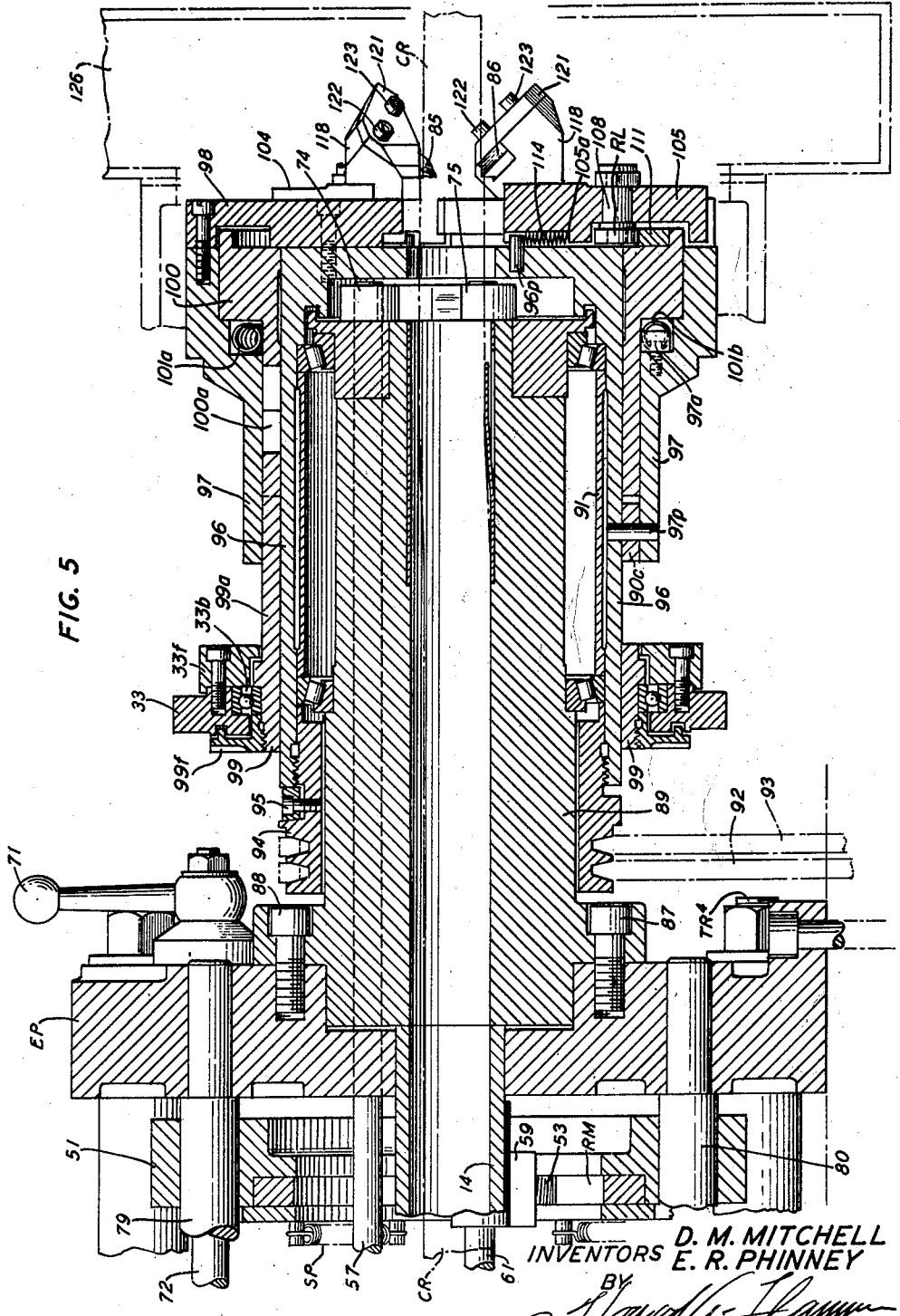
FIG. 5 is a sectional view taken on line 5—5 of FIG. 3.
Figure 6:
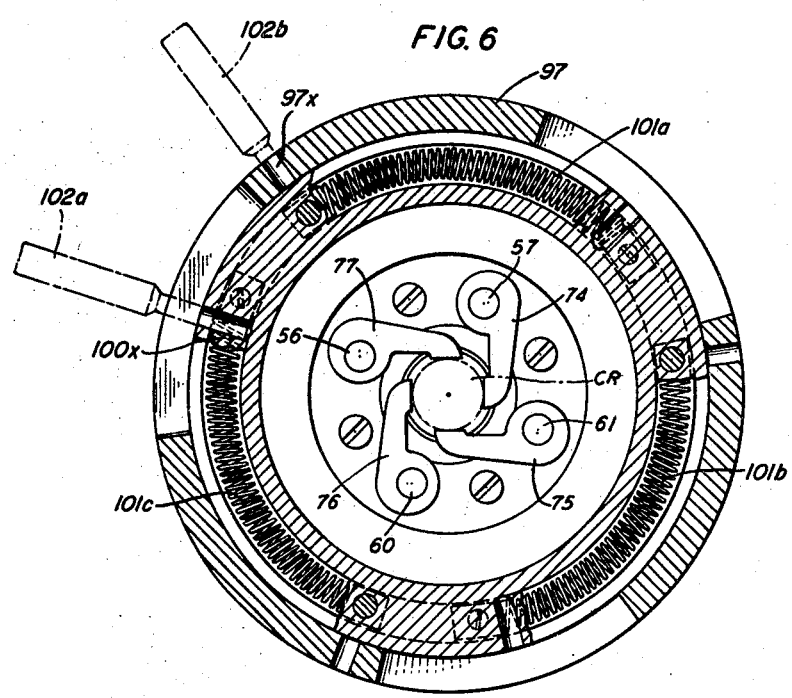
FIG. 6 is a sectional view of the centering guides, taken on line 6—6 of FIG. 4.
Figure 19:
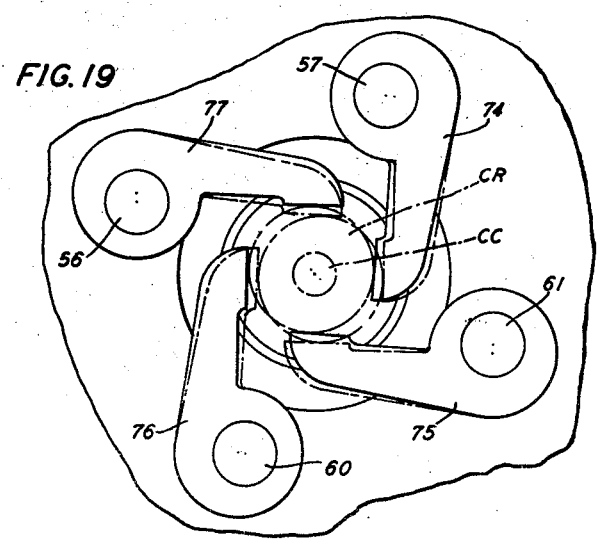
FIG. 19 is an enlarged elevation view of the centering guide mechanism shown in FIG. 6.

As shown in FIG. 2 and more in detail in FIG. 10, the shafts 56, 57, 60 and 61 have mounted thereon the dog members 63, 64, 65 and 66, which are adapted to engage the extending pin members 67, 68, 69 and 70 positioned on the interior of the housing 62, when the manually operated lever arm 71 secured to the shaft 72 is rotated, which through the pinion 73 causes the rotation of the gear housing 62 and the consequent repositioning of the pins 67, 68, 69 and 70 which causes the rotation of the shafts 56, 57, 60 and 61, permitted by the rotation of the ring members RM against counterpoising springs SP (FIGS. 4, 5, and 14), which causes the opening of the centering guide fingers 74, 75, 76 and 77 disclosed in FIGS. 6 and 19 which are adjacent to the shaving head 98 (FIG. 2), thus permitting manual disengagement of the fingers, as disclosed in FIGS. 6 and 19 from the cable core CR.

Figure 13:
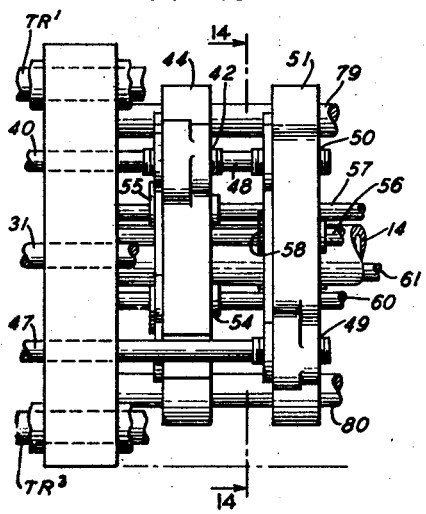
FIG. 13 is a fragmentary view of the centering control actuators.

Guide rods 79 and 80 are provided in the bosses 81 and 82 of the rings 44 and 51 to maintain the rings in juxtaposition with respect to each other (FIGS. 2, 13 and 14).

As shown in FIG. 2, and more in detail in FIGS. 6 and 19, the free ends of the shafts 56, 57, 60 and 61 have secured thereon the finger members 74, 75, 76 and 77. These fingers are spaced equidistant around the core CR, shown in dot and dash lines, and will move inwardly or outwardly against the outer surface of the core CR as shown in FIG. 19, to control the lateral position of the core, with respect to the cutting head 98 in accordance with signals transmitted from a suitable eccentricity monitor which may comprise two sets of capacitance electrodes, each of which measure in a vertical or horizontal plane the capacitance unbalance between the corresponding pair of electrodes and the inner conductor of core CR, a measurement structure well known in the art and no further description of such a structure is believed necessary other than to state that the boxes VE and HE disclosed in FIG. 24 are indicative of these devices.

As disclosed in FIG. 24, signals are transmitted from the vertical eccentricity control means VE to a suitable servo control VSC, of a well-known type and comprising suitable gearing to the shaft 26 which in turn causes the rotation either clockwise or counterclockwise of the worm 23, gear 17 and gear 20 associated therewith. In mesh with the gear 20 are the pinions 38 and 39 which are secured to the shafts 47 and 48, which in turn are in threaded engagement at 49 and 50 with the ring 51, thus the rotation of the shafts 47 and 48 will cause the forward or backward movement of the ring 51, and due to the engagement of the internal gear segments 52 and 53 on the interior thereof with the gear sectors 58 and 59 on the shafts 56 and 61, the fingers 75 and 77 on the shafts 56 and 61 will rotate either upward or downward in concert as shown in FIG. 19 to displace the cable core CR in a vertical direction.

As further disclosed in FIG. 24, signals are also transmitted from the horizontal control means HE in a manner as heretofore described with respect to the vertical control means VE. These signals are transmitted to the horizontal eccentricity servo control means HSC through suitable gearing, not shown, to the shaft 25 which in turn drives the worm 22, either in a clockwise or counterclockwise direction, this action causes the gear 16 to rotate and carry with it the gear 19. In constant mesh with the gear 19 are the pinions 36 and 37 which are secured to the shafts 40 and 41 which in turn are in threaded engagement with the ring segment 44 at bushings 42 and 43. Thus, the rotation of the shafts 40 and 41 causes the forward or backward movement of the ring 44 and due to the engagement of the internal helical gear segments 45 and 46 located therein, with the gear sectors 54 and 55 on the shafts 57 and 60 the fingers 74 and 76 on these shafts will rotate either right or left in concert, as shown by dot and dash lines in FIG. 19 to displace the cable core CR in a horizontal direction.

Experience has shown that successful eccentricity control requires that normal variations in the diameter of core as extended not be permitted to interfere with the centering action. In this instance such provision is made by having ring members RM spring mounted within rings 44 and 51. Thus, each pair of guiding fingers 74, 76 and 75, 77 can be displaced with respect to each other without affecting cable center.

The foregoing description relates to the interaction of the various components to control the eccentricity of the cable core CR with respect to the central conductor CC as it passes through and is shaved by the knives which will be described forthwith.

The cable core is shaved to size by suitable shaving knives which may be manually adjusted by means of the control wheel 83 as shown in FIGS. 1 and 7 or automatically controlled by means of a suitable sensing device D and servo control means DSC to vary the depth of the cut as indicated in FIG. 24. However, the manual and the automatic control devices both operate through a gear train to adjust the knives in the shaving head plate 98 which will be henceforth described in detail.

As shown in FIGS. 1, 2, 24 and more in detail in FIG. 7, gear 15 is rotatably mounted on the tube 14. Associated with gear 15 and rotatable with it is the gear 18, which has in mesh therewith the pinions 27 and 28 which have threadedly journaled therein in suitable bushings, as shown in FIG. 18, the shafts 31 and 32.

The shafts 31 and 32, as shown in FIG. 2, extend longitudinally and are secured to the plate 33 by means of the nuts 34 and 35, thus any forward or backward movement imparted to the shafts 31 and 32 by the clockwise or counterclockwise rotation of the pinions 27 and 28 will cause the plate 33 and its associated parts, which will hereinafter be described in detail, to move coaxially with respect to the cable core CR, and cause the blades 84, 85 and 86 in the cutting head to converge, or diverge with respect to the cable core CR.

Mounted on the end plate EP of the gear compartment CMPT, and secured thereto by means of the studs 87 and 88 is the hollow spindle member 89, which serves as support and guide tube for the cutting head assembly shown in section in FIG. 5, which is rotatably mounted thereon on suitable bearings and is driven by the grooved pulley 94 through the medium of the belts 92 and 93 by the motor 13.

Figure 4:
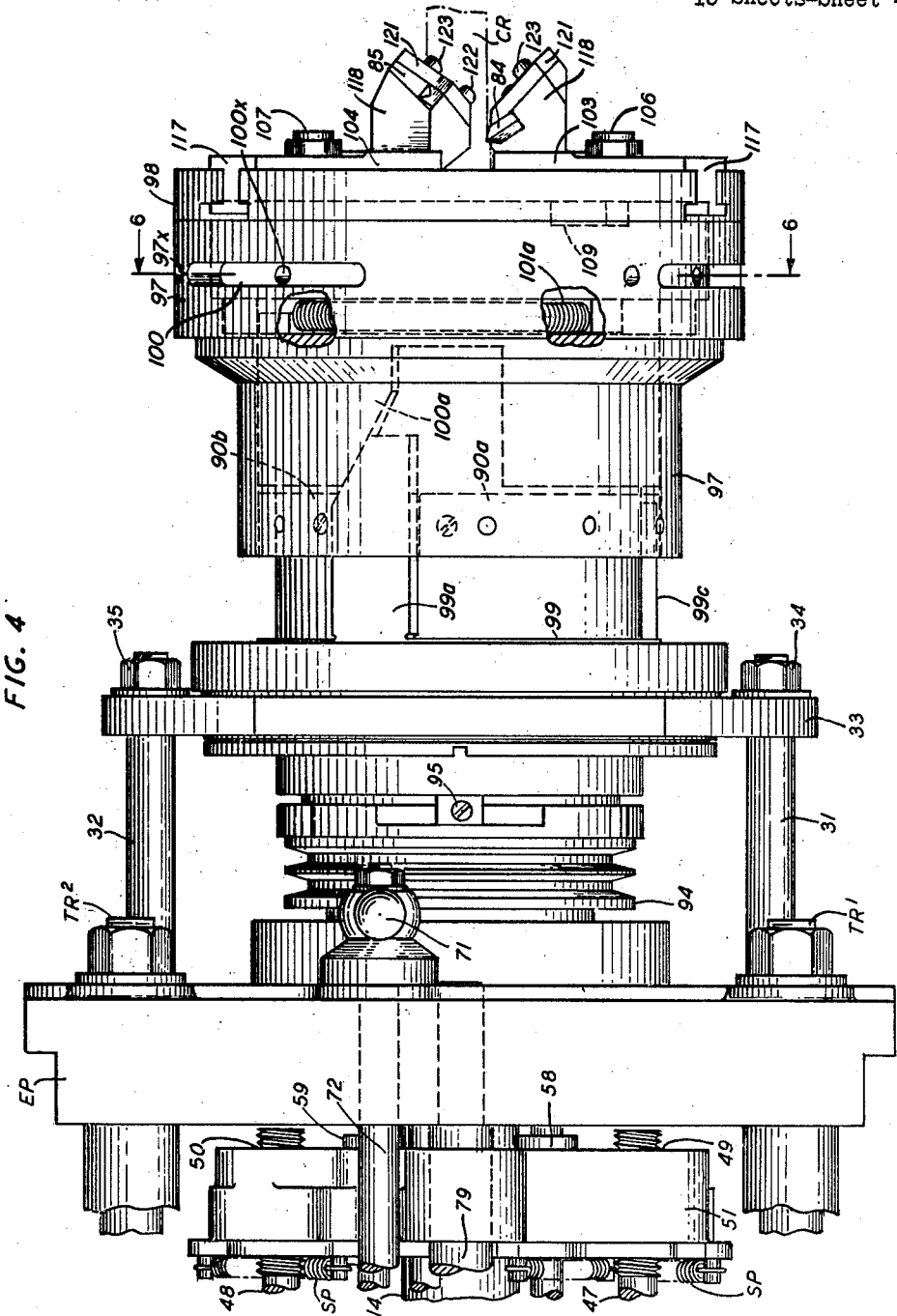
FIG. 4 is a top plan view of the shaving head showing the diameter control actuator, taken on line 4—4 of FIG. 3.

The sleeve 96 is threaded onto the pulley 94 and clamped with the screws 95. Around the sleeve 96 is the ring 99 having on it three equally spaced cams or fingers, one of which 99a is shown on FIGS. 2, 4, and 5. The finger 99c is shown in FIGS. 2 and 4 and the third finger 99b is out of sight in all of these figures. The ring 99 is rotatable with respect to the ring 33 by virtue of the bearing 33b but is constrained to move axially with the ring 33 by the flanges 33f and 99f. The sleeve 96 with all of the parts that are attached to it is mounted for rotation on the spindle 89 by the bearing assembly 91.

Around the sleeve 96 is a ring 90 having three segments 90a, 90b, and 90c (see FIGS. 4 and 5) each secured to the sleeve 96, as will be subsequently explained. Surrounding the outer portion of the sleeve 96 (to the right in FIGS. 2, 4, and 5) is a ring 100 having fingers 100a, 100b, and 100c, mating respectively with the fingers 99a, b, and c of the ring 99.

Another sleeve 97 surrounds the ring 100 and its fingers, the segmented ring 90, and the outer ends of the fingers 99a, b, and c. As may be seen at the bottom in FIG. 5, the sleeve 96, the segment 90c of the ring 90, and the sleeve 97 are secured together by the pin 97p. Similar pins, not shown, pass through the members 96 and 97 and appropriate ring segments 90a and 90b.

As best seen in FIG. 5, the ring 100 and the sleeve 97 have facing shoulders that define between them annular spaces or pockets in which are housed three symmetrically arranged springs 101a, 101b, and 101c. See also FIGS. 4 and 6. The springs 101 are held in compression between screws secured respectively in the ring 100 and the sleeve 97. One such screw in the sleeve 97 is shown at 97a near the bottom of FIG. 5. This screw bears on one end of the spring 101b, the other end of which is restrained by a screw in the ring 100. The effect of the springs 101 is to force the mating fingers 99a, b, and c and 100a, b, and c respectively into contact. The mating surfaces of these fingers are sloped, as particularly shown in FIGS. 2 and 4. It will be remembered that the rotation of the sleeve 97 is transmitted to the fingers 99a, b, and c by the respective ring segments 90a, b, and c. Thus, when the ring 99 and its fingers 99a, b, and c are moved axially by the controlled movement of the diameter control ring 33, the ring 100 is rotated by virtue of the interacting spring biased fingers.

Secured in spaced relation within the outer flange of the ring 100 are the spiral cam segments 109, 110, and 111. See all three in FIG. 2 and a section of 111 in FIG. 5 at bottom right.

Figure 23:
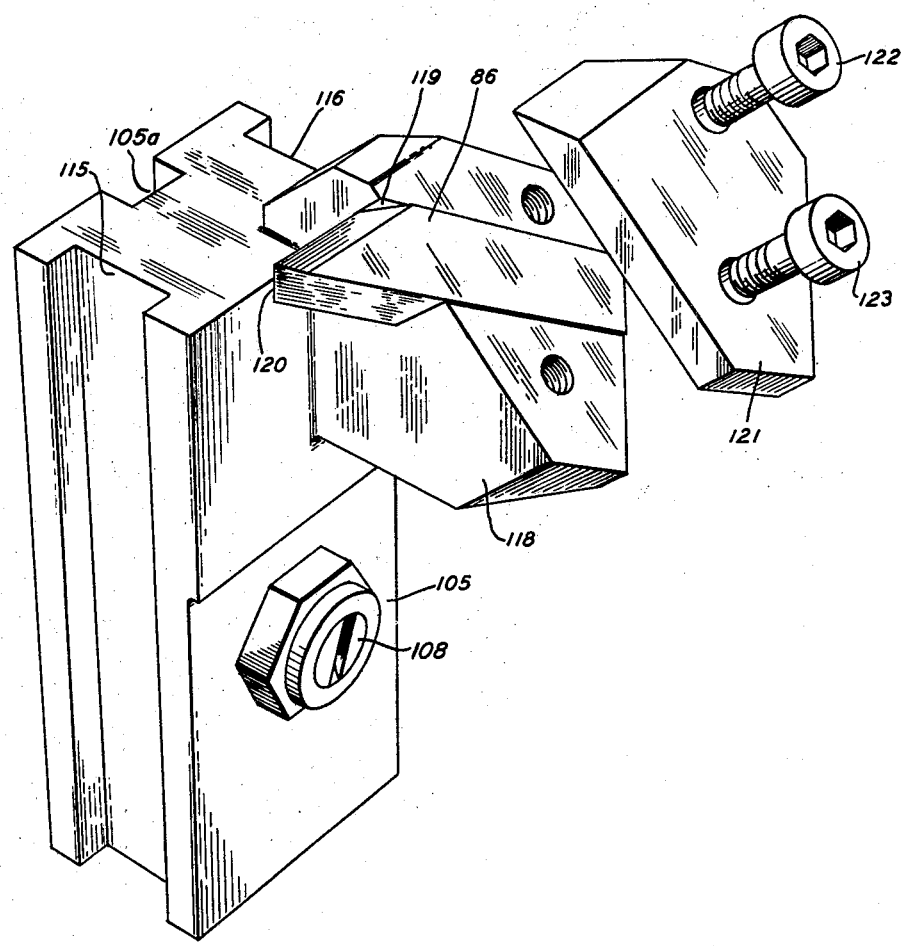
FIG. 23 is an enlarged detailed view, in perspective, of one of the cutter holder assemblies.

Secured to the outer flange of the sleeve 97 is the shaving head plate 98 in which are located, as at 117, the cutters or knife holders 103, 104, and 105 on which are mounted the blades or bits 84, 85, and 86 (see FIGS. 3, 4, 5, and 23). As shown in FIG. 23, each holder, in this case 105, has a projection 118 containing a groove 119 for adjustably mounting a blade or bit 86, which is clamped by the plate 121 and the screws 122 and 123. A pocket or slot 105a in the back of the holder 105 is for a biasing spring 114, as later described.

The holders, for example, 105, are of generally I section having channels 115 and 116 which are fitted into radial slots in the plate 98. As shown in FIGS. 5 and 20, the holder 105 has secured to its backside a roller RL held by the stud ST and the screw 108. The roller is located in a pocket in the back of the holder so as to bear against the spiral cam segment 111. The pocket or slot 105a, also in the back of the holder 105, accommodates the spring 114 which is restrained by the pin 96p in the head of the sleeve 96. The other two holders 103 and 104 are similarly arranged.

Thus, each holder is biased radially outward to urge the knives away from the cable core CR. The spiral cam segments 109, 110, and 111 bear on the rollers RL to limit and control the position of the holders so urged.

Accordingly, when the diameter sensing means D (FIG. 24) rotates the shaft 24 in response to changes in core diameter, the plate or ring 33 is moved axially by a previously described linkage. The motion of this plate 33 is imparted by the spring biased fingers 99a, b, and c and 100a, b, and c to the spiral cams 109, 110, and 111. These cams acting on the rollers and against the bias of the springs, for example, RL and 114 of FIG. 5, position the knives radially to shave the core to the right size.

As shown in FIGS. 4 and 6, the handled dowels 102a and 102b may be inserted respectively in the holes 100x and 97x in the sleeves 100 and 97 and drawn together to retract the knives. This may be done, for example, when the core is being threaded into the shaver.

Figure 22:
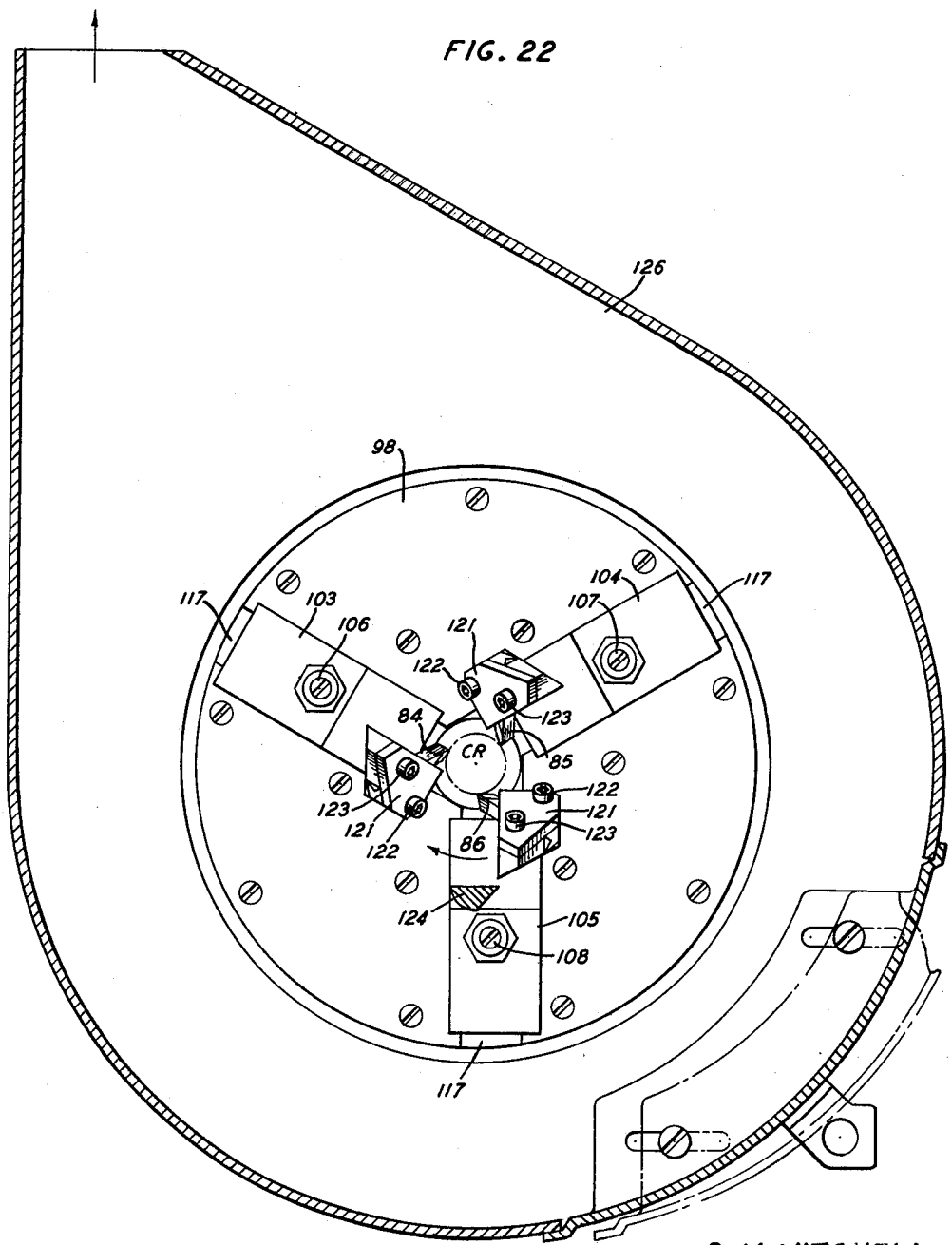
FIG. 22 is a front elevation view of the structure shown in FIG. 21, taken on line 22—22.

In order that the shavings leave the shaving mechanism in an expeditious manner, means have been provided as shown in FIGS. 21 and 22 for the disposal of the scrap material as it leaves the core CR. Since the shavings leave the core in a continuous form, it has been found that the centrifugal force exerted by the cutting knives 84, 85 and 86 can be used to break up these shavings by impinging them on a suitable cutting member 124 mounted on the plate 125, which in turn is secured to the casing 126 by bolts 127. This cutting member has a substantially triangular configuration and breaks up the shavings into small particles as they are thrown thereagainst, and are deposited in the casing 126 which is connected to a suitable exhaust system, not shown.

In order to provide a suitable outboard support for the core CR, the plate 129 has secured thereto by suitable screws 130 a casting 131 which in turn has mounted therein a sleeve 132, which is bushed by an internal collar 133 having a central bore therein and secured in position which is secured by the bolts 134 and 135 which is adapted to receive the core CR as it leaves the shaving head. Suitable channels are provided between 131 and 132 to permit the introduction of air for removal of fines.

While we have shown and described the preferred embodiment of our invention, it is to be understood that various changes and modifications may be made therein without departing from the spirit and scope of the invention.

What is claimed is:

1. A mechanism for shaving to a preassigned diameter the insulation of a cable core including a central conductor, said mechanism comprising a rotatable shaving head including radially adjustable knives positioned to encompass the core, and adjustable to a required cutting circle, means for operating and adjusting the knives comprising a mounting plate, a hollow spindle secured to and projecting from the plate, a first sleeve rotatably mounted on the spindle, means for rotating said sleeve, a first ring including a first set of spaced longitudinally extending camming fingers mounted on the first sleeve for longitudinal movement with respect thereto, a segmented ring also mounted on the first sleeve and including a camming finger between each adjacent pair of its segments for rotation therewith, an adjusting ring including a second set of spaced longitudinally extending camming fingers mounted on the first sleeve, said fingers mating with and biased against respective fingers of the first set for rotation upon longitudinal movement of said first set, a shouldered sleeve surrounding the adjusting ring, its fingers, and a portion of the mating fingers; a shaving head plate secured to the outer end of the shouldered sleeve, means resiliently coupling the adjusting ring to the shouldered sleeve and biasing the sets of camming fingers together, and means securing together for simultaneous rotation the first sleeve, the ring segments, and the shouldered sleeve; means coupling the first ring to core diameter sensing means for longitudinal movement in response to variations in core diameter, means adjustably mounting the knives on the shaving head plate, and means coupling the adjusting ring to the knives.

2. A shaving mechanism as in claim 1 including means for sensing eccentricity of the core insulation with respect to the conductor and responsive to the sensing means for adjusting the core to a position in which the conductor is concentric with the cutting circle of the shaving knives.

3. A mechanism for shaving to a preassigned diameter the insulation of a cable core including a central conductor, said mechanism comprising a rotatable shaving head, a plurality of radially arranged knives on the head and adjustable to a required cutting circle, means for operating and adjusting the knives comprising a mounting plate, a spindle secured to the plate, a first sleeve rotatably mounted on the spindle, means for rotating said sleeve, a first ring including a first set of spaced longitudinally extending camming fingers mounted on the first sleeve for longitudinal movement with respect thereto, a segmented ring also mounted on the first sleeve and including one of the camming fingers between each adjacent pair of its segments for rotation therewith, an adjusting ring including a second set of spaced longitudinally extending camming fingers mounted on the first sleeve, said fingers mating with and biased against respective fingers of the first set for rotation about the first sleeve upon longitudinal movement of said first set of fingers, a stepped sleeve surrounding the adjusting ring, encompassing the adjusting ring, fingers, and a portion of the mating fingers; a shaving head plate secured to the stepped sleeve, means resiliently coupling the adjusting ring to the stepped sleeve and biasing the sets of camming fingers together, and means securing together for simultaneous rotation the first sleeve, the ring segments, and the stepped sleeve; means coupling the first ring to core diameter sensing means for inducing longitudinal movement in said ring in response to variations in core diameter, means adjustably mounting the knives on the shaving head plate, and means coupling the adjusting ring to the knives.

References Cited in the file of this patent

UNITED STATES PATENTS

| | | |
|---|---|---|
| 1,676,738 | Lotterman et al. | July 10, 1928 |
| 2,030,562 | Barnes et al. | Feb. 11, 1936 |
| 2,484,601 | Abbey | Oct. 11, 1949 |

FOREIGN PATENTS

| | | |
|---|---|---|
| 609,591 | Canada | Nov. 29, 1960 |